United States Patent
Benhase et al.

(10) Patent No.: US 7,487,319 B2
(45) Date of Patent: Feb. 3, 2009

(54) RESOURCE ALLOCATION UNIT QUEUE

(75) Inventors: Michael Thomas Benhase, Tucson, AZ (US); Lawrence Carter Blount, Tucson, AZ (US); James Chien-Chiung Chen, Tucson, AZ (US); Juan Alonso Coronado, Tucson, AZ (US); Roger Gregory Hathorn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/993,740

(22) Filed: Nov. 18, 2004

(65) Prior Publication Data

US 2006/0107015 A1 May 18, 2006

(51) Int. Cl.
*G06F 12/00* (2006.01)
*G06F 13/00* (2006.01)
*G06F 13/28* (2006.01)

(52) U.S. Cl. .............. 711/170; 711/171; 711/172; 711/173; 718/104; 718/108; 707/205; 709/220; 709/221; 709/222; 710/8; 710/9; 710/10; 710/54; 710/56; 710/104

(58) Field of Classification Search ......... 711/170–173; 707/205; 709/220–222; 718/104, 108; 710/8–10, 710/54, 56, 104
See application file for complete search history.

(56) References Cited

U.S. PATENT DOCUMENTS

| | | | | |
|---|---|---|---|---|
| 5,671,446 | A * | 9/1997 | Rakity et al. | 710/54 |
| 6,622,177 | B1 * | 9/2003 | Eilert et al. | 710/3 |
| 6,742,091 | B2 * | 5/2004 | Oksanen | 711/154 |
| 2001/0005853 | A1 | 6/2001 | Parkes et al. | |
| 2001/0049717 | A1 * | 12/2001 | Freeman et al. | 709/203 |
| 2003/0225948 | A1 | 12/2003 | Jarvis et al. | |
| 2003/0236961 | A1 * | 12/2003 | Qiu et al. | 711/170 |
| 2005/0114858 | A1 * | 5/2005 | Miller et al. | 718/100 |

OTHER PUBLICATIONS

W.S. Cadden, et al., "Multi-Access First-In-First-Out Queue Using 370 Compare and Swap", IBM Corp. Technical Disclosure Bulletin, vol. 36, No. 02, Feb. 1993, pp. 327-330.

M. Kennedy, et al., "Task Allocation Schemes for Response-Time Improvement in an Educational LAN", IEEE, Jun. 1989, pp. 234-241.

P. Larson et al., "Memory Allocation for Long-Running Server Applications", ACM, 1998, pp. 176-185.

(Continued)

*Primary Examiner*—Sanjiv Shah
*Assistant Examiner*—Yaima Campos
(74) *Attorney, Agent, or Firm*—William K. Konrad; Konrad Raynes & Victor LLP (57) ABSTRACT

Provided is a method, system, deployment and program for resource allocation unit queuing in which an allocation unit associated with a task is classified. An allocation unit freed as the task ends is queued for use by another task in a queue at a selected location within the queue in accordance with the classification of said allocation unit. In one embodiment, an allocation unit is queued at a first end of the queue if classified in a first class and is queued at a second end of the queue if classified in said second class. Other embodiments are described and claimed.

10 Claims, 5 Drawing Sheets

OTHER PUBLICATIONS

G.J. Narlikar, et al., "Pthreads for Dynamic and Irregular Parallelism", ACM, 1998, [online] retrieved Aug. 9, 2004, http://delivery.acm.org/10.1145/510000/509089/a31-narlikar.html?key1=509089& key2=4068 . . . .

M.M. Michael, "ScalableLock-Free Dynamic Memory Allocation", ACM, May 2004, pp. 35-46.

Feng, G. et al, "Active Resource Allocation for Active Reliable Multicast", IEEE Proceedings-Communications © 2003, vol. 150, No. 2, pp. 69-79.

* cited by examiner

RESOURCE ALLOCATION UNIT QUEUE

BACKGROUND

1. Field

The present invention relates to a method, system, deployment and program for managing resources.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller.

To maintain availability in the event of a failure, many storage controllers known in the prior art provide redundant hardware clusters. Each hardware cluster comprises a processor complex, cache, non-volatile storage (NVS), such as a battery backed-up Random Access Memory (RAM), and separate power supply to provide connection paths to the attached storage. The NVS in one cluster backs up write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

In performing these and other tasks, a cluster can not only execute operations locally using the capabilities of the local cluster itself, but can also make a request to have an operation executed on a remote cluster in the storage controller system. Moreover, each storage controller may have an adapter to communicate over a network with a host computer or another storage controller. For example, the write instructions from the primary storage controller to a secondary storage controller may be generated by a processor of the adapter of the primary storage controller and issued over the network to the secondary storage controller.

There are numerous techniques for determining which portion or portions of a memory are cached in the cluster processor cache or adapter CPU cache. In many such techniques, the more frequently data is utilized in a cache, the more likely it will be retained in cache. Conversely, the longer data in cache remains unused, the more likely it is that the data will be overwritten with data from another memory location.

Many tasks have an associated data structure, often referred to as a task control block, in which operational parameters, status information and other data concerning the task may be stored. This data may be utilized not only in the performance of the task but also to diagnose problems should errors arise.

Each task or operation may consume a significant portion of the resources of the cluster or adapter which is performing the requested operation. These resources may include memory space, the bandwidth of a bus or the bandwidth of a network connection, as well as the computational capabilities of the processors of the cluster or adapter.

Various techniques have been used to manage the allocation of resources so that operations proceed in an appropriate fashion. For example, resources may be subdivided into allocation units which are placed in one or more queues. Thus, an allocation unit may be a portion of memory, a task control block, a portion of bus bandwidth, etc. In order for a task to execute, the appropriate resource allocation units are taken from the queues and allocated for use by that task. Upon completion or other termination of the task, the allocation units assigned that task are freed and returned to the appropriate queues for use by subsequent tasks.

In one known system, allocation units are allocated to new tasks from the top of the queue, and once the task ends, the freed allocation units are returned to the bottom of the queue. Thus, the least recently used allocation unit is the next one to be allocated. Such an arrangement can preserve the data associated with the allocation unit by delaying the reusage of that allocation unit. Thus, for example, if the allocation unit is a task control block, the data of that task control block may be preserved for problem diagnosis or other uses until that task control block reaches the top of the queue and is reused and its data overwritten.

In the other hand, if the allocation unit is a portion of memory containing data which has been cached in the cluster processor cache, such a delay in the reusage of the data stored in cache may cause that data to be flushed from cache before it can be utilized by another task. The likelihood of premature flushing of data from the cache increases as the length of the allocation unit queue increases.

In some systems, the length of the allocation unit queue may be restricted to increase cache usage efficiency. If the number of allocation units available to be allocated from the queue is insufficient to meet the demand for allocation units, the allocation of the resource allocation units may be rationed by queuing the tasks themselves in various types of queues to await the availability of allocation units needed for task execution.

Another known approach is to not only assign allocation units to new tasks from the top of the queue, but also, once the task ends, to return the freed allocation units to the top of the queue. Thus, the most recently used allocation unit is the next one to be allocated. Such an arrangement can increase cache efficiency. However, the preservation of historical data associated with the allocation unit may be adversely affected by the rapid reusage of that allocation unit.

SUMMARY OF ILLUSTRATED EMBODIMENTS

Provided is a method, system, deployment and program for resource allocation unit queuing in which an allocation unit associated with a task is classified. An allocation unit freed as the task ends is queued for use by another task in a queue at a selected location within the queue in accordance with the classification of said allocation unit. In one embodiment, an allocation unit is queued at a first end of the queue if classified in a first class and is queued at a second end of the queue if classified in said second class. Other embodiments are described and claimed.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
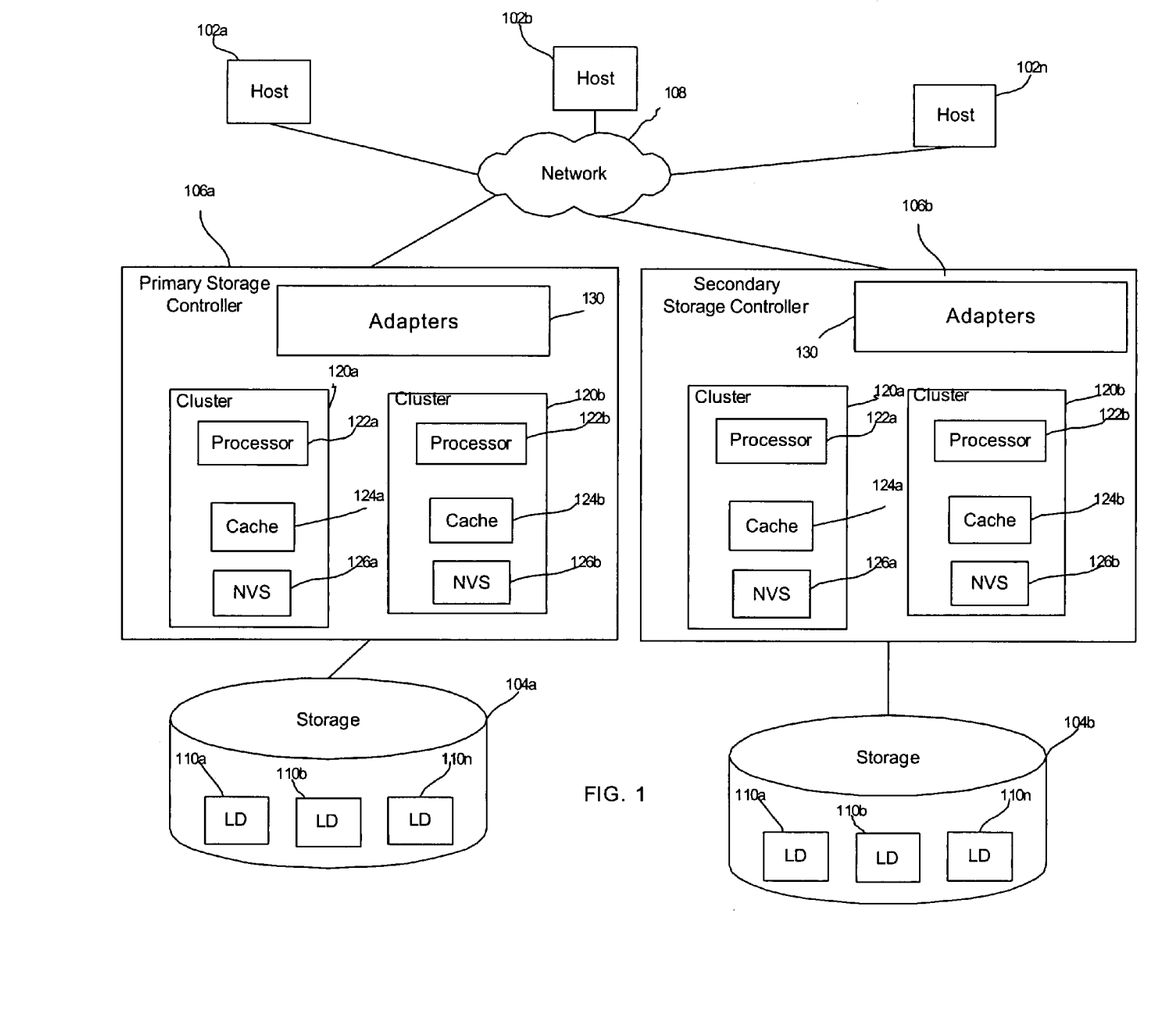
FIG. 1 illustrates an example of a computing environment in which aspects of the invention are implemented.

FIG. 1 illustrates a computing architecture in which aspects of the invention are implemented. One or more hosts 102a, 102b ... 102n are in data communication with a primary storage system 104a, such as a DASD or any other storage system known in the art, via a primary storage controller 106a. In a similar manner, the hosts 102a, 102b ... 102n are in data communication with a secondary storage system 104b, such as a DASD or any other storage system known in the art, via a secondary storage controller 106b. The host 102 may be any computing device known in the art, such as a server, mainframe, workstation, personal computer, hand held computer, laptop, telephony device, network appliance, etc. The storage controllers 106a, 106b and host system(s) 102 communicate via a network 108, which may comprise a Storage Area Network (SAN), Local Area Network (LAN), Intranet, the Internet, Wide Area Network (WAN), etc. The primary and secondary storage systems 104a, 104b may each be comprised of hard disk drives, tape cartridge libraries, optical disks, or any suitable non-volatile storage medium known in the art.

The primary and secondary storage systems 104a, 104b may each be arranged as an array of storage devices, such as a Just a Bunch of Disks (JBOD), DASD, Redundant Array of Independent Disks (RAID) array, virtualization device, etc. The primary and secondary storage controllers 106a, 106b may comprise any storage controller or server known in the art, such as the IBM Enterprise Storage Server (ESS) or any other storage controller known in the art. In certain implementations, the storage space in each of the storage systems 104a, 104b may be configured as a plurality of logical devices (LD) 110a, 110b ... 110n.

The primary storage 104a or the logical devices 110a, 110b ... 110n may each be divided into blocks of storage containing blocks of data, and the blocks of storage can be further divided into sub-blocks of storage that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The storage controllers 106a, 106b each include two separate clusters 120a, 120b of hardware components to provide redundancy for improved availability. Although the illustrated embodiment is described in connection with a storage controller having clusters, it is appreciated that the description provided herein may be applicable to a variety of systems utilizing a single processor or multiple processors.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b ... 102n would submit application I/O requests directed to a target logical device (LD) 110a, 110b ... 110n, including write data, to the cluster 120a, 120b to which the target logical device (LD) 110a, 110b ... 110n is assigned. The NVS 126a, 126b in one cluster 120a, 120b is used to backup write data in the cache 124b, 124a in the other cluster 120b, 120a, e.g., NVS 126a backs up write data in cache 124b.

The storage controller 106a, 106b includes a read process for reading data, and a write process for writing data. The primary storage controller 106a also includes a sync process for transferring data from the primary storage controller 106a to remote storage, such as storage 104b at the secondary storage controller 106b. Each task or operation of each process is dispatched by an operation dispatcher, for execution, when the task acquires the controller resources needed to execute the task. The operation dispatcher may be implemented in software, firmware, hardware or a combination of these within the processor 122a, 122b or an adapter 130.

In certain implementations, the read process, write process, and sync process are implemented as firmware. In certain implementations, the read process, write process and sync process are implemented as separate software programs for each process. In certain implementations, the read process, write process and sync process may be combined with each other or other software programs.

Secondary storage controller 106b provides one or more recovery systems access to disk storage, such as secondary storage 104b, which maintains back-up copies of all or a subset of the volumes of the primary storage 104a. Secondary storage may be a Direct Access Storage Device (DASD). Secondary storage 104b is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage, such as secondary storage 104b may be used to maintain back-up copies of all or a subset of the primary storage 104a, and the techniques of the invention transfer data to the removable storage rather than to the remote storage. The removable storage may reside at the primary storage controller 106a.

In certain implementations, the primary storage controller 106a and secondary storage controller 106b may be comprised of the IBM Enterprise Storage Server, or any other control unit known in the art.

In certain embodiments, the primary storage controller 106a and/or secondary storage controller 106b may comprise any computing device known in the art, such as a mainframe, server, personal computer, workstation, laptop, handheld computer, telephony device, network appliance, virtualization device, storage controller, etc.

A primary site may include multiple primary storage controllers, primary storage, and host computers. A secondary site may include multiple secondary storage controllers, recovery systems, and secondary storage.

In certain embodiments, data is maintained in volume pairs. A volume pair is comprised of a volume in a primary storage device (e.g., primary storage 104a) and a corresponding volume in a secondary storage device (e.g., secondary storage 104b) that includes a consistent copy of the data maintained in the primary volume. For example, primary storage 104a may include Volume1 and Volume2, and secondary storage 104b may contain corresponding Volume1 and Volume2. A primary storage controller may be provided to control access to the primary storage and a secondary storage controller may be provided to control access to the secondary storage.

In certain embodiments, the primary storage controller 106a and secondary storage controller 106b communicate via communication paths, such as direct high speed transmission lines (e.g., an Enterprise System Connection (ESCON®), or Fiber connection (FICON) or Fibre Connection Protocol (FCP) link). However, the communication paths may be comprised of any other communication means known in the art, including network transmission lines, fiber optic cables, etc.

Each storage controller 106a, 106b of the illustrated embodiment further includes a network adapter 130 which permits each storage controller 106a, 106b to communicate with each of the hosts 102a, 102b . . . 102n as well as the other storage controller. For communication among the clusters and adapter of each storage controller 106a, 106b, each cluster 120a, 120b and adapter 130 has a mail manager process.

To write data to a target logical device 110a, 110b . . . 110n, a host such as host 102a issues a write command such as a SCSI (small computer system interface) embedded in a suitable network protocol frame as a Fibre Channel Protocol (FCP) frame to the primary storage controller 106a. The network adapter 130 of the primary storage controller 106a receives the write command and sends an appropriate write operation via its mail manager to the mail manager of the one of the clusters 120a, 120b of the primary storage controller 106a.

As previously mentioned, it is often useful for data to be written onto more than one storage device so that if the data is lost on one device, the data may be retrieved from the other device. One technique for achieving this redundant data writing is to pair a logical storage device 110a, 110b . . . 110n of one storage controller 106a with a logical storage device 110a, 110b . . . 110n of another storage controller 106b, for example. Thus, for example, the logical storage device 110a of the storage controller 106a may be paired with the logical storage device 110a of the storage controller 106b. In such an arrangement, the cluster 120a of the storage controller 106a can be programmed to recognize that a write operation to the logical storage device 110a of the storage controller 106a should be repeated on the logical storage device 110a of the storage controller 106b.

For synchronous PPRC®, before a host such as host 102a completes writing a chain of tracks to the primary storage controller 106a, all tracks in the chain will typically have also been transferred to the secondary storage controller 106b. In certain implementations, this transfer would be accomplished by a synchronization process which will typically have been completed before an acknowledgment of completion of the write process is sent to the host 102a.

For PPRC® Extended Distance, the host 102a will complete writing a track to the primary storage controller 106a without the track having been sent to the secondary storage controller 106b. After the track has been written to the primary storage controller 106b, the sync process will discover that an indicator corresponding to the track is set to indicate that the track is out of sync with a corresponding track at the secondary storage controller 106b and will send the track to the secondary storage controller 106b. That is, the track is sent asynchronously with respect to the track written by the host.

To send a track to the secondary storage controller 106b, the cluster 120a can send a mail message to the network adapter 130 of the primary storage controller 106a. In response, the network adapter 130 of the primary storage controller 106a can, in a manner similar to that of a host 102a, 102b . . . 102n issue a write command such as a SCSI (small computer system interface) command embedded in a suitable network protocol frame as a fiber channel Protocol (FCP) frame to the secondary storage controller 106b. The network adapter 130 of the secondary storage controller 106b receives the write command and sends an appropriate write operation via its mail manager to the mail manager of the one of the clusters 120a, 120b of the secondary storage controller 106b.

As previously mentioned, each task or operation utilizes a portion of the resources of the cluster 120a, 120b or adapter 130 which is performing the requested operation. These resources may include memory space, the bandwidth of a bus or the bandwidth of a network connection, as well as the computational capabilities of the processors of the cluster or adapter. To manage the allocation of resources so that operations proceed in an appropriate fashion, resources are subdivided into allocation units which are placed in one or more queues. Thus, an allocation unit may be a portion of memory, a task control block, a portion of bus bandwidth, etc. In order for a task to execute, the appropriate resource allocation units are taken from the queues and allocated for use by that task. Upon completion or other termination of the task, the allocation units assigned that task are freed and returned to the appropriate queues for use by subsequent tasks.

In accordance with one aspect of the description provided herein, allocation units once freed, may be queued at a selected location of the queue in accordance with a classification of the allocation unit. As explained in greater detail below, such an arrangement may facilitate efficient cache utilization as well as preservation of significant historical data concerning the execution of various tasks. It is appreciated that other aspects may be utilized, depending upon the particular application.

Figure 2:
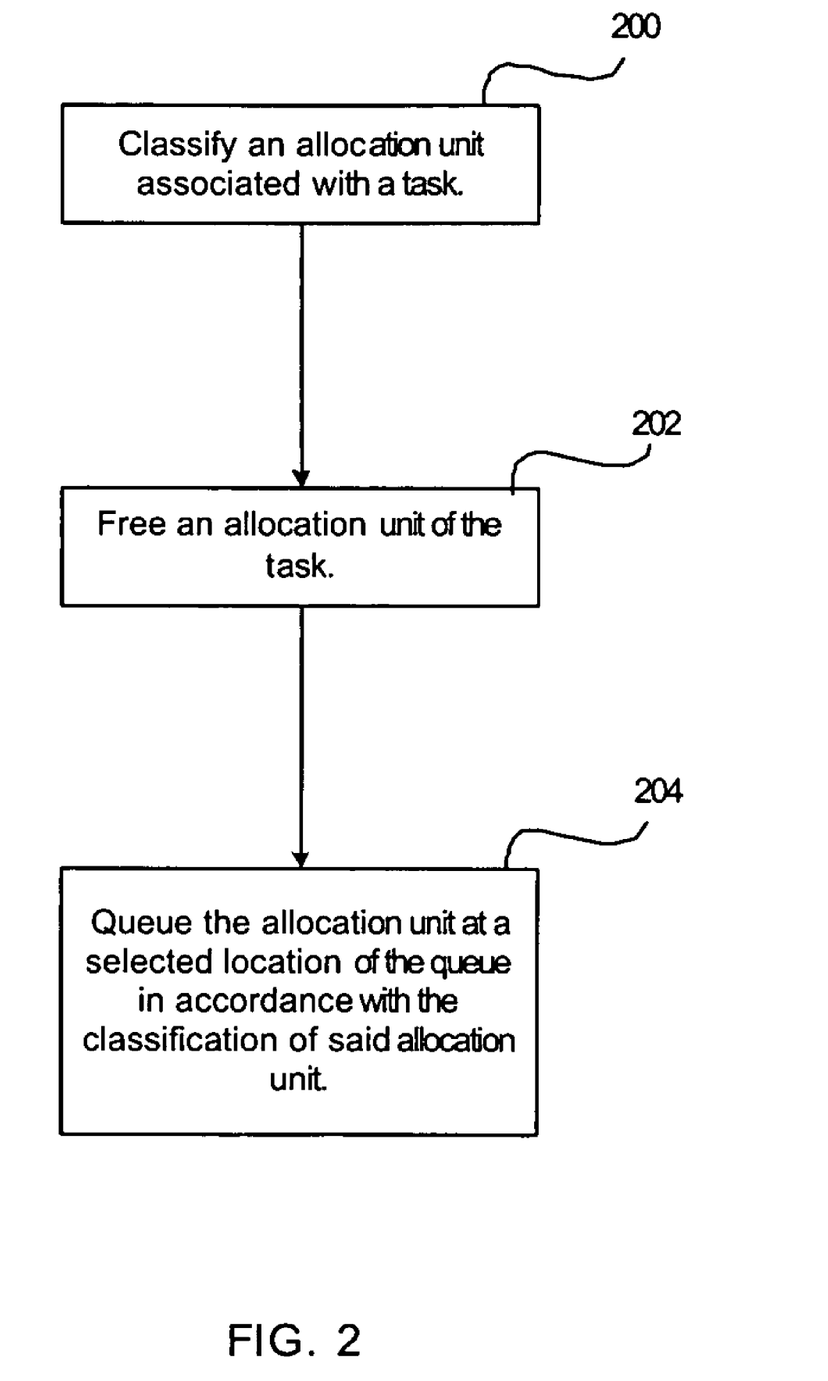
FIG. 2 illustrates an example of queuing of resource allocation units in accordance with one aspect of the description provided herein.

FIG. 2 shows an example of operations of an operation dispatcher of a cluster or adapter such as cluster 120a which can facilitate cluster or adapter operations in the allocation of resources to tasks or operations. For example, the adapter 130 may be a FIBRE channel adapter running a protocol such as the FC-SB-2 (FICON) FC4 Upper Level Protocol. It is appreciation that other protocols may be used as well.

In one operation, one or more resource allocation units are classified (block 200). These allocation units are associated with a task and are utilized as allocated allocation units by the associated task in the execution of that task. The classification may take place before, during or after the execution of the associated task.

As explained in greater detail below, the classification of allocation units may be based on various criteria. For example, one criterion may be the type of the task to which the allocation unit is associated. Another criterion may be the completion results of the associated task. It is appreciated that other criteria may be utilized as well to classify the allocation units.

As the execution of the associated task ends, the allocation units allocated to that task may be freed (block 202) for use by other tasks. Accordingly, the freed allocation units may be queued (block 204) in one or more queues to await being allocated to another task. In accordance with one aspect of the description provided herein, the location within the queue at which a particular freed allocation unit is queued, may be selected as a function of the classification of the particular application unit.

For example, a freed allocation unit may be queued at the top of its particular queue if classified in a first classification. Alternatively, an allocation unit may be queued at the bottom of its particular queue if classified in a different classification. It is appreciated that the location within a queue at which a particular allocation unit is queued, may vary, depending upon the particular application.

Figure 3:
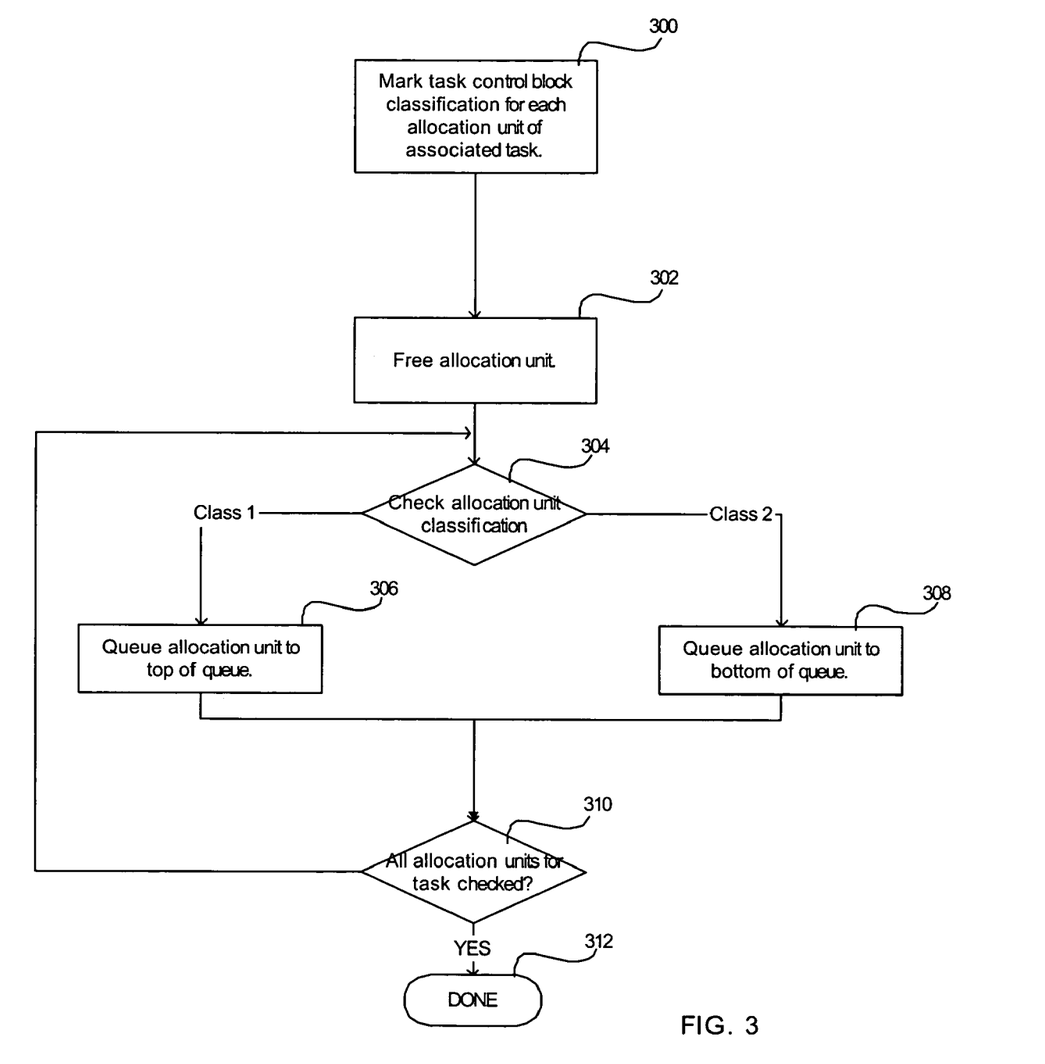
FIG. 3 illustrates another example of queuing of resource allocation units in accordance with one aspect of the description provided herein.

FIG. 3 shows a more detailed example of operations of an operation dispatcher of a cluster or adapter such as cluster 120a which can facilitate cluster or adapter operations in the allocation of resources to tasks or operations. In one operation, a task control block for a task is marked (block 300) to indicate the classification of one or more allocation units allocated to that task. In this example, the associated task of the task control block has ended prior to the classifying and freeing of the allocation units allocated to that task. As previously mentioned, it is appreciated that the classification of the allocation units allocated or to be allocated to a task may be performed before, during or after the task ends, depending upon the particular application.

Figure 4:
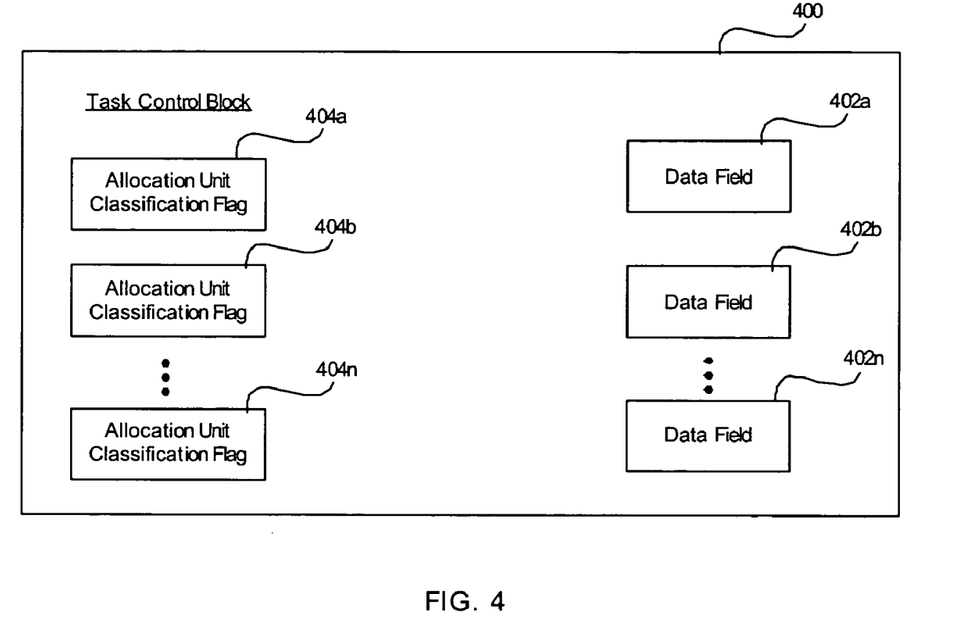
FIG. 4 illustrates one example of a data structure used in queuing resource allocation units.

FIG. 4 shows an example of a task control block 400 which provides a data structure for a task such as a read or write operation, for example. It is appreciated however that other types of data structures may be used to store classification information. The task control block 400 of this example includes a plurality of data fields 402a, 402b . . . 402n, each of which may store data such as parameters or other data used to direct the execution of the associated task. The fields 402a, 402b . . . 402n may also store status information describing the manner in which the task was executed including status or check information describing the completion result. Thus, for example, if at some point during the execution of the task an error condition occurred, one or more bits may be set in one or more of the fields 402a, 402b . . . 402n to indicate an error or check condition.

In addition, the task control block 400 has one or more allocation unit classification flags 404a, 404b . . . 404n which may be marked (block 300) to indicate the classification of one or more allocation units allocated to that task. In one example, the task control block 400 may utilize a single allocation unit classification field, such as the field 404a, for example, to indicate the classification of all allocation units (including the task control block 400 itself) allocated to the task associated with the task control block 400. Thus, when such an allocation unit classification flag such as the flag 404a, for example, is set (to a "1" value, for example), it may indicate that all resource allocation units allocated to the task of this task control block 400 (including the task control block 400 itself) should be freed to the top of their respective queues upon ending of the task of the task control block 400. Conversely, when such an allocation unit classification flag such as the flag 404a, for example, is reset (to a "0" value, for example), it may indicate that all resource allocation units allocated to the task of this task control block 400 (including the task control block 400 itself) should be freed to the bottom of their respective queues upon ending of the task of the task control block 400.

In another example, the task control block 400 may utilize two or more allocation unit classification fields, such as the fields 404a, 404b, for example, to indicate the classification of different types of allocation units allocated to the task associated with the task control block 400. For example, the field 404a may be used to indicate the classification of memory portion allocation units allocated to the task associated with the task control block 400. Thus, when the allocation unit classification flag 404a is set, it may indicate that all memory portion resource allocation units allocated to the task of this task control block 400 should be freed to the top their queue upon ending of the task of the task control block 400, and when reset, should be freed to the bottom of their queue upon ending of the task of the task control block 400.

As a further example, the field 404b may be used to indicate the classification of various data structures such as the task control block 400 itself which were allocated to the task. Thus, when the allocation unit classification flag 404b is set, it may indicate that the task control block 400 allocation unit allocated to this task should be freed to the top its queue upon ending of the task of the task control block 400, and when reset, should be freed to the bottom of its queue upon ending of the task of the task control block 400. It is appreciated that the number of allocation unit classification fields 404a, 404b and 404n and the types of allocation units classified with each field 404a, 404b and 404n may vary, depending upon the particular application.

When an allocation unit classification field, such as the field 404a, for example, is set to indicate that resource allocation units associated with this field should be freed to the top of their respective queues upon ending of the task of the task control block 400, those allocation units may be described as being classified as belonging to a first class which may be referred to herein as a "Class 1", for example. In the illustrated embodiment, allocation units classified as Class 1 may be deemed to be allocation units in which rapid reuse is a higher priority. For example, a memory portion allocation unit which has been cached in the cache of the cluster and the task associated with that cached memory portion allocation unit has completed successfully without an error or check condition, may be a good candidate for Class 1 classification. If so, the memory portion allocation unit may be freed to the top of the respective queue to facilitate rapid reuse of that allocation unit. Hence, the data associated with that memory portion is more likely to be in cache when that memory portion allocation unit is reused by the next task.

Conversely, when an allocation unit classification field, such as the field 404a, for example, is reset to indicate that resource allocation units associated with this field should be freed to the bottom of their respective queues upon ending of the task of the task control block 400, those allocation units may be described as being classified as belonging to a second class which may be referred to herein as a "Class 2", for example. In the illustrated embodiment, allocation units classified as Class 2 may be deemed to be allocation units in which history data recovery is a higher priority. For example, a task control block allocation unit for a task which has ended with an error or check condition, may be a good candidate for Class 2 classification. If so, the task control block allocation unit may be freed to the bottom of the respective queue to delay reuse of that allocation unit. Hence, the data associated with that task control block is more likely to be available for study in a subsequent task control block dump or other diagnostic or recovery operation.

Figure 5:
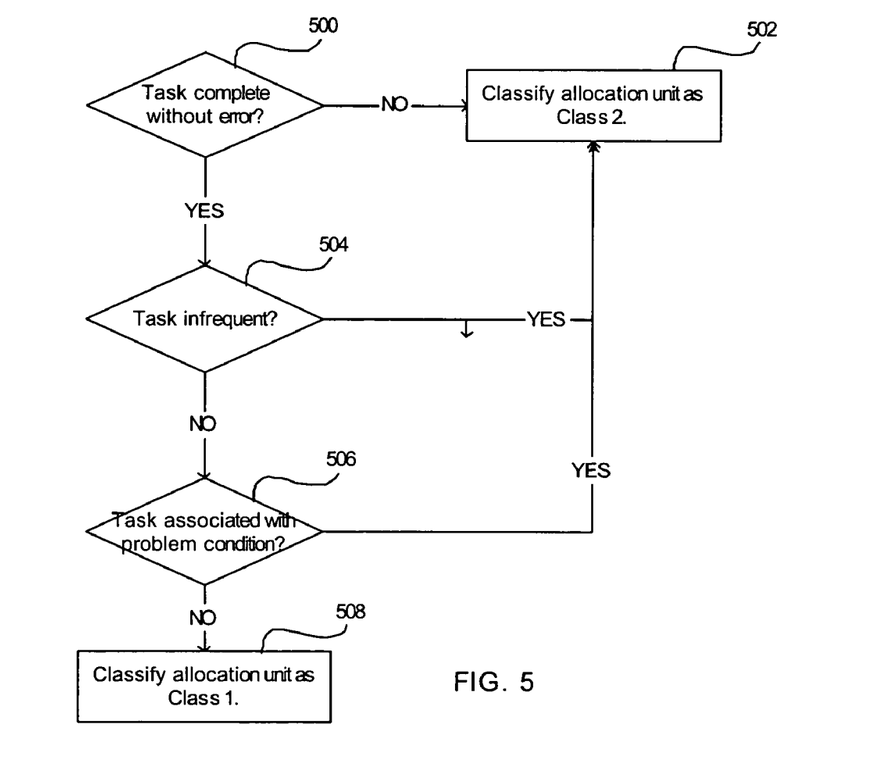
FIG. 5 illustrates one example of classifying tasks for use in queuing of resource allocation units in accordance with one aspect of the description provided herein.

FIG. 5 illustrates an example of operations to classify allocation units associated with a task. In the illustrated embodiment, several criteria are depicted for use in the classification of resource allocation units. It is appreciated that fewer, additional or different criteria from those illustrated, may be used for classification purposes, depending upon the particular application. Also, in the illustrated embodiment, resource allocation units are classified as "Class 1", that is, allocation units that are freed to the top of their respective queue, or "Class 2", that is, allocation units that are freed to the bottom of their respective queue. It is appreciated that other classes may be used in addition to or instead of these classes, including classes indicating freeing of allocation units to other locations within a queue.

In one operation, a determination (block 500) as to whether the task associated with that allocation unit (or units) completed without error. Such a determination may be made by examining one or more of the appropriate data fields 402a, 402b . . . 402n of the task control block 400 associated with that task, for example. In the illustrated embodiment, if the task completed with an error or other check condition, the allocation unit is classified (block 502) as a "Class 2", that is, the allocation unit should be freed to the bottom of its respective queue. Queued at the bottom of its respective queue, reuse of that allocation unit is delayed while the allocation unit percolates up towards the top of the queue. Hence, data associated with that allocation unit, such as data in a task control block, for example, is more likely to be available for study in a subsequent data dump or other diagnostic or recovery operation. Accordingly, the appropriate allocation unit classification field 404a, 404b . . . 404n associated with that allocation unit is marked (block 300, FIG. 3) to indicate Class 2 classification.

If it is determined (block 500) that the task associated with the allocation unit did complete without error or other check condition, another determination (block 504) may be made as to whether the task occurs "infrequently." If so, the allocation unit is classified (block 502) as a "Class 2", that is, the allocation unit should be freed to the bottom of its respective queue, to increase the likelihood that allocation unit, such as data in a task control block, for example, is available for study in a subsequent data dump or other diagnostic or recovery operation. Accordingly, the appropriate allocation unit classification field 404a, 404b . . . 404n associated with that allocation unit is marked (block 300, FIG. 3) to indicate Class 2 classification.

Tasks that occur infrequently are less likely to have a significant impact on overall cache efficiency if freed to the bottom of the queue. In addition, a number of infrequent tasks are likely to have significant diagnostic data useful in a recovery operation. For example, in a storage controller, a device level control task such as Selective Reset, Cancel or System Reset are tasks which are relatively infrequent as compared to data read or data write tasks. As another example, a link-level control task such as Establish Logical Path is a relatively infrequent task. Other examples include "task management" functions in FCP such as clear task, abort task, etc. and to many other link-level functions in FICON, and FCP extended link services. Allocation units allocated to such infrequent tasks may be classified as Class 2 so that they will be freed to the bottom of their respective queues upon being freed.

If it is determined (block 504) that the task associated with the allocation unit is not an infrequent task, another determination (block 506) may be made as to whether the task is associated with a "problem condition." If so, the allocation unit is again classified (block 502) as a "Class 2", that is, the allocation unit should be freed to the bottom of its respective queue. Accordingly, the appropriate allocation unit classification field 404a, 404b . . . 404n associated with that allocation unit is marked (block 300, FIG. 3) to indicate Class 2 classification.

For example, a task may originate from the occurrence of a problem condition. For example, if a task or a Channel Command Word (CCW) chain initiated by a FICON channel is disconnected with split status of channel end or retry status, the value of the data associated with the allocation units for problem determination may be increased. Such conditions generally occur less frequently and may indicate problems with cache or non-volatile storage utilization. The task executing the chain that was disconnected may be classified as Class 2 since it did not complete without error or a check condition (block 500). In addition, the task used for reconnection to complete the operation may be classified as Class 2 since the reconnection task originated from a prior problem condition, that is, the original disconnection.

In the illustrated embodiment, if it is determined (block 500) that the task associated with the allocation unit did complete without error or other check condition, and it is determined (block 504) that the task associated with the allocation unit is a frequent task, and it is determined (block 506) that the task is not associated with a "problem condition," the allocation unit may be classified (block 508) as a Class 1, that is, the allocation unit should be freed to the top of its respective queue to permit rapid reuse to increase cache efficiency. It is appreciated that other classification criterion may be used and for other purposes.

Upon classification of the allocation units allocated to a task, and marking (block 300) the appropriate fields 404a, 404b . . . 404n of the control block 400 associated with the task, one or more of the allocation units may be freed (block 302, FIG. 3) as the task ends. For each freed allocation unit, the classification of the allocation unit may be checked (block 304). In the illustrated embodiment, the classification of a freed allocation unit may be checked by examining the appropriate allocation unit classification flag 404a, 404b . . . 404n of the control block 400 associated with the task to which that allocation unit is allocated. It is appreciated that classifications may be recorded in a variety of data structures, depending upon the particular application.

If it is determined that the allocation unit has been classified as Class 1, the freed allocation unit is queued (block 306) to the top of its respective queue. Conversely, if it is determined that the allocation unit has been classified as Class 2, the freed allocation unit is queued (block 308) to the bottom of its respective queue.

In another operation, a determination (block 310) may be made as to whether there are additional allocation units to queue. If so, the classification for the remaining freed allocation units may be checked (block 304) and queued at the top (block 306) or bottom (block 308) in accordance with the classification of the particular allocation unit. Once it is determined (block 310) that all of the freed allocation units have been queued, the process is complete (block 312).

Additional Implementation Details

The described techniques for queuing resource allocation units may be implemented as a method, apparatus, deployment or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

In the described implementations, certain operations were described as performed by the processors of the processor complexes 122a, and 122b or the adapter 130. In alternative implementations, certain operations described as performed by the processors may be performed by a variety of computers, processors, and controllers. For example, one embodiment was described as a FIBRE Channel adapter. It is appreciated that alternative embodiments include storage controller I/O adapters, storage controller device adapters, storage controller servers, tape and disk drive firmware, zOs Channel adapters, zOs software applications, host bus adapters, personal computer software programs, operating system software, storage controller initiator adapters for peer to peer communication, etc.

In the described implementations, dual clusters were provided. In alternative implementations, there may be one or more than two clusters and resource management may be practiced in any one cluster.

The illustrated logic of FIGS. 2, 3 and 5 show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 6:
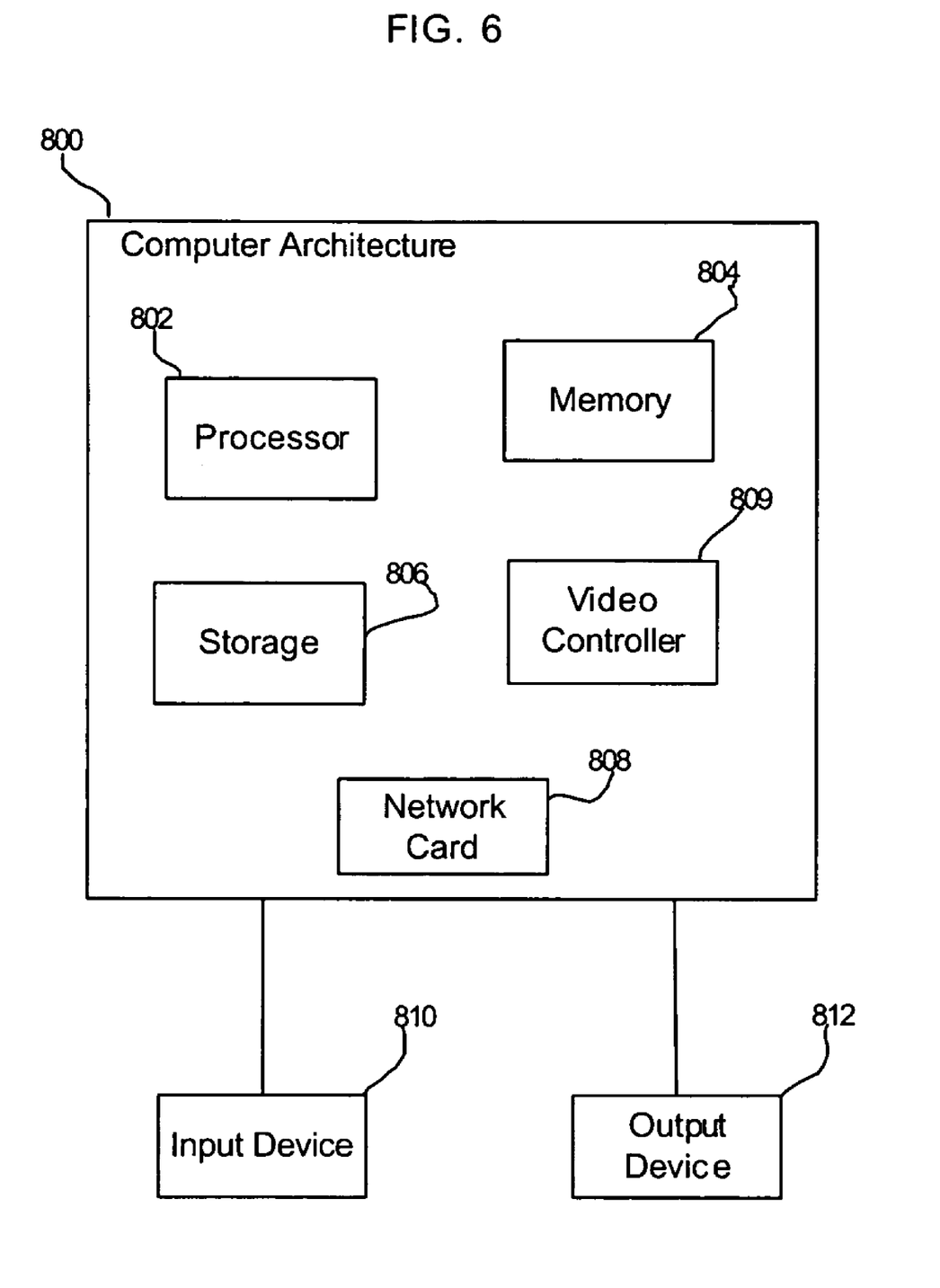
FIG. 6 illustrates an architecture of computing components in a network environment, such as the hosts, storage controllers, clusters, and any other computing devices.

FIG. 6 illustrates one implementation of a computer architecture 800 of the network components, such as the hosts and storage controller clusters shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various embodiments of the invention has been presented for the purposes of illustration. It is not intended to be exhaustive or to limit to the precise form disclosed. Many modifications and variations are possible in light of the above description.

What is claimed is:

1. A method, comprising:

classifying an allocation unit associated with a task wherein said allocation unit is a resource selected from the group consisting of a portion of a processor computational capacity, a portion of a connection bandwidth, a task control block and a portion of memory containing historical data associated with a previously executed task, and wherein said classifying includes classifying an allocation unit in a first class having a priority for preservation of historical data of a first type associated with the allocation unit being classified, and classifying an allocation unit in a second class having a priority for preservation of historical data of a second type associated with the allocation unit being classified;

freeing an allocation unit of said task;

and queuing the freed allocation unit for reuse by another task in a queue at a selected location of said queue in accordance with said classification of said allocation unit, wherein said queuing includes queuing an allocation unit at a first end of said queue if classified in said first class and queuing an allocation unit at a second end of said queue if classified in said second class wherein said allocation units are removed from said queue in queue order staffing at said first end, for reuse by another task wherein reuse of queued allocation units of said first class is advanced and reuse of queued allocation units of said second class is delayed;

wherein said classifying includes determining the contents of an allocation unit classification flag associated with the allocation unit being classified, and classifying the allocation unit being classified in one of said first class and said second class as determined by the contents of the allocation unit classification flag associated with the allocation unit being classified;

wherein said allocation unit classification flag is a field in a task control block having a plurality fields, each field containing one of a plurality of allocation unit classification flags, each flag being associated with one type of a plurality of different types of allocation units being classified.

2. The method of claim 1 wherein said classifying includes classifying an allocation unit in said first class if the allocation unit being classified is a portion of memory containing historical data which has been cached and classifying an allocation unit in said second class if the allocation unit is a task control block having data structures for storing task diagnosis historical data.

3. The method of claim 2 wherein said classifying includes classifying an allocation unit in said first class if the task associated with the allocation unit completes without an error.

4. The method of claim 2 wherein said classifying includes classifying an allocation unit in said second class if the task associated with the allocation unit completes with an error.

5. The method of claim 4 wherein said task completing with an error is an input/output task that completes with a check condition.

6. The method of claim 2 wherein said classifying includes classifying an allocation unit in said first class if the task associated with the allocation unit occurs with a first frequency and classifying an allocation unit in said second class if the task associated with the allocation unit occurs with a second frequency which is less frequent than said first frequency.

7. The method of claim 6 wherein said tasks which occur with a second frequency which is less frequent that said first frequency include device level control tasks including at least one of selective reset, cancel and system reset tasks and task management functions including at least one of clear task and abort task.

8. The method of claim 7 wherein said tasks are performed by a storage controller and wherein said tasks which occur with a second frequency which is less frequent than said first frequency are a link-level control task.

9. The method of claim 8 wherein a link-level control task is an establish logical path task.

10. The method of claim 7 wherein said tasks are performed by a storage controller and wherein said classifying includes classifying an allocation unit in said second class if the task associated with the allocation unit is initiated by a channel and is disconnected and includes classifying an allocation unit in said second class if the associated task is used to reconnect a chain that was disconnected.

* * * * *